Aug. 1, 1961  E. J. SIMANEK  2,994,409
TREAD BRAKE ARRANGEMENT
Filed Jan. 19, 1959
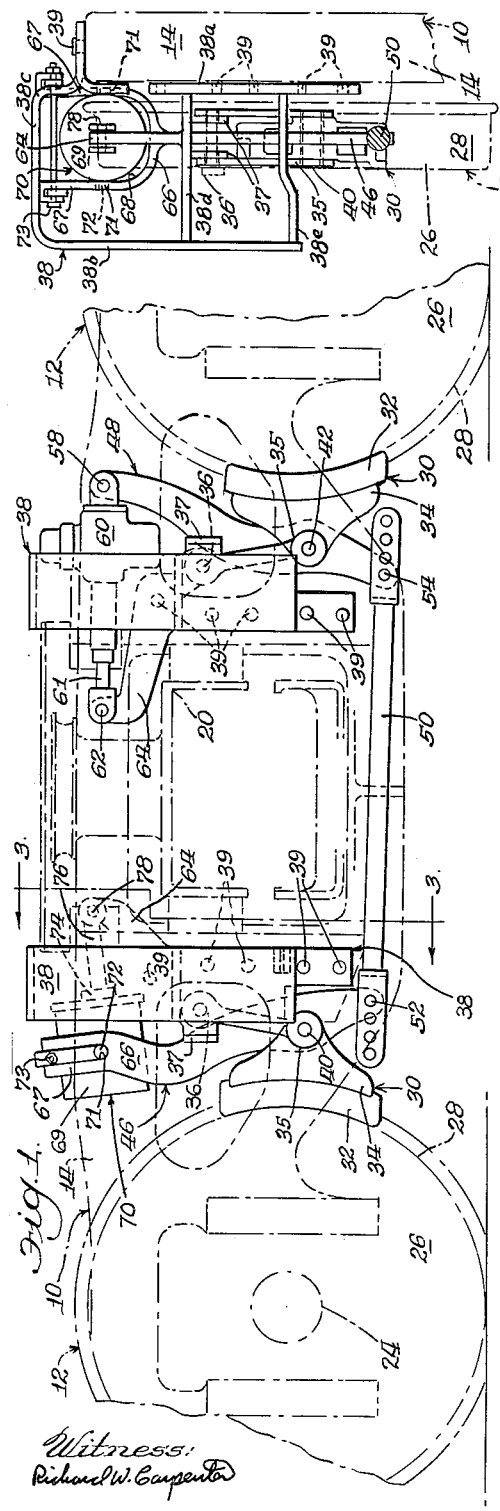
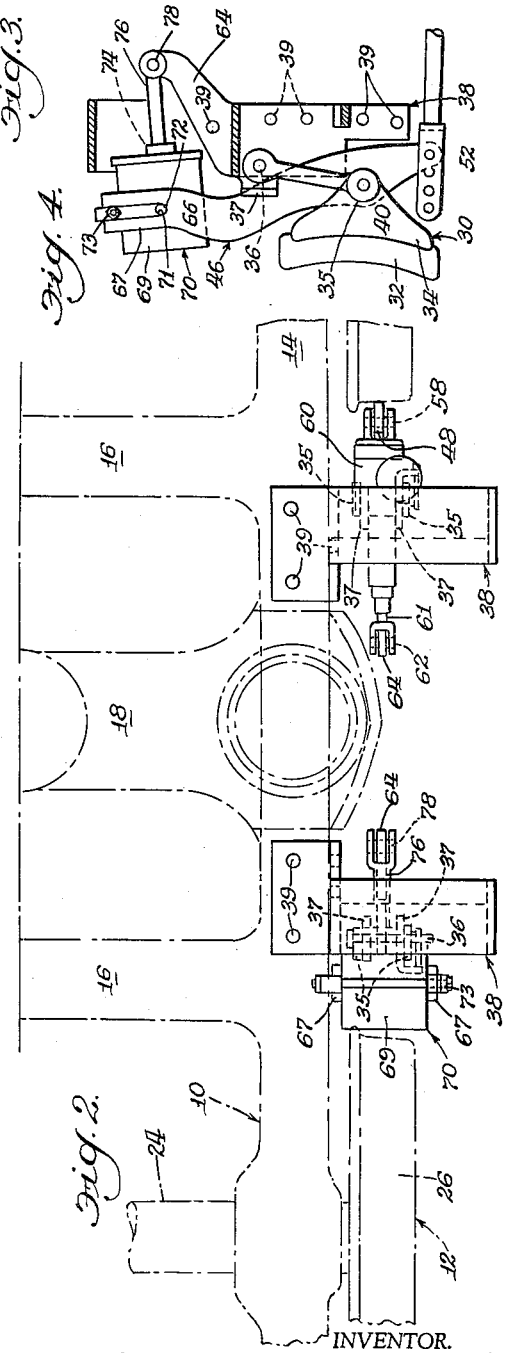
INVENTOR.
Edward J. Simanek
BY Walter L. Schlegel, Jr.
Atty.

United States Patent Office 2,994,409
Patented Aug. 1, 1961

2,994,409
TREAD BRAKE ARRANGEMENT
Edward J. Simanek, Homewood, Ill., assignor to American Steel Foundries, Chicago, Ill., a corporation of New Jersey
Filed Jan. 19, 1959, Ser. No. 787,743
9 Claims. (Cl. 188—52)

This invention relates to brakes and more particularly to a tread brake arrangement for railway vehicles.

The invention comprehends a brake arrangement of the type known in the art as a single shoe brake.

As is known to those familiar with railway car trucks, they may be divided into two types of trucks: the outboard truck, wherein the side members of the truck frame are located outboardly of the wheels; and the inboard truck, wherein the side members of the frame are located inboardly of the wheels.

The brake arrangement embodied in applicant's invention, although suitable for use with outboard trucks, is particularly well suited for inboard trucks, because it is a compact arrangement which may be easily fitted into the limited space between the frame and wheels which is available for the brake mechanism and linkage.

It is therefore a primary object of this invention to provide a compact and efficient single shoe brake arrangement of simple design and construction which is particularly adapted for use on inboard type railway car trucks.

A more specific object of the invention is the provision of a floating single shoe tread brake arrangement for a four wheel inboard truck, including a pair of vertical brake levers pivoted to power cylinder and slack adjuster members which are pivotally connected to the truck frame.

These and other objects of the invention will be apparent from an examination of the following description and drawings, wherein:

FIGURE 1 is a fragmentary side elevational view of a railway car truck to which has been applied a brake arrangement embodying features of the invention;

FIGURE 2 is a top plan view of one half of the structure illustrated in FIGURE 1, the structure being symmetrical about its longitudinal vertical center plane;

FIGURE 3 is a fragmentary vertical sectional view taken on line 3—3 of FIGURE 1; and FIGURE 4 is a fragmentary side elevational view of a portion of the structure illustrated in FIGURE 1 with parts of the bracket broken away.

It will be understood that certain elements have been intentionally omitted from certain views where they are better illustrated in other views.

Referring now to the drawings for a better understanding of the invention, it will be seen that the novel brake arrangement embodying features of the invention is applied to a railway car truck comprising a frame 10 supported on a pair of spaced wheel and axle assemblies 12.

The truck frame comprises a pair of longitudinally extending side members 14 which may be interconnected by preferably integrally formed longitudinally spaced transversely extending transoms 16 and also by a separate transversely extending bolster 18 disposed between the transoms 16 and having its ends received in bolster opening 20 of the respective side members and resiliently supported therein by spring means (not shown).

Each wheel and axle assembly comprises an axle 24 having secured thereto a pair of wheels 26 (only one of which is shown) each of which presents a tread surface 28.

Disposed inwardly adjacent the wheels of the respective assemblies are brake shoe assemblies 30, each comprising a brake shoe 32 for engagement with the related wheel tread surface 28 and a brake head 34 detachably mounting the related brake shoe.

The brake shoe assemblies may be supported from the truck frame by a pair of hangers or links 35 which are pivotally connected at their upper ends by pins 36 to lugs 37 of brackets 38 and pivotally connected at their lower ends to the left and right hand brake shoe assemblies 30, as seen in FIGURE 1, by pins 40 and 42, respectively.

As best seen in FIGURE 3, bracket 38 is generally in the form of an inverted U comprising horizontally spaced vertically extending parallel inboard and outboard side plates 38a and 38b respectively, which are interconnected by a plurality of vertically spaced transversely extending cross plates 38c, 38d and 38e. The inboard plate 38a of the bracket 38 may be detachably connected to frame side member 14 by a plurality of nut and bolt assemblies 39.

Operation of the brake shoe assemblies is achieved by means of a pair of generally vertically extending left and right brake levers 46 and 48, respectively, which are, as best seen in FIGURE 1, disposed inwardly adjacent the wheels of the respective wheel and axle assemblies and which are pivotally connected intermediate their ends to respective brake shoe assemblies 30 by common pivot pins 40 and 42, respectively.

At their lower ends, the levers are interconnected by a compression rod 50 which is pivotally connected at opposite ends by pins 52 and 54 to levers 46 and 48, respectively.

As seen in FIGURE 1, the upper end of brake lever 48 is pivotally connected by pin 58 to one portion of an automatic slack adjuster device 60, another portion 61 of which is pivotally connected by pin 62 to an arm 64 extending upwardly from crossplate 38d frame side member bracket 38.

At its upper end, brake lever 46 is bifurcated to present a yoke or clevis 66 comprising a pair of arms 67 having aligned openings 71 and defining therebetween a generally U-shaped opening 68 within which is disposed a housing 69 of a power cylinder 70. The power cylinder housing 70 may be provided with a pair of opposed transversely extending aligned trunnions 72 which are journalled within the openings 71 of respective clevis arms 67. The upper extremities of clevis arms 67 may be interconnected by a nut and bolt assembly 73 which serves to add rigidity to the structure and also aid in retaining housing 70 within clevis opening 68.

The cylinder may include a relatively movable piston 74 having extending therefrom a piston rod 76 which is pivotally connected by a pin 78 to another arm 64 presented by the frame side bracket 38 and located on the opposite side of the bolster from the arm 64 to which the slack adjuster is pivotally connected.

To describe the operation of the device, again referring to FIGURE 1, it will be seen that as the power cylinder 70 is energized, its housing 69 moves to the left, relative to piston 74, carrying with it the upper end of left hand brake lever 46 and thereby causing the brake lever to rotate in a counterclockwise direction about pin 52 and carry its related brake shoe assembly 30 into engagement with the tread surface 28 of the adjacent wheel 26. Upon the engagement of the brake shoe with the wheel, lever 46 continues to rotate in a counterclockwise direction as its fulcrum point shifts from pin 52 to pin 40. Thus, the continued movement of the lever urges compression rod 50 to move to the right causing right hand brake lever 48 to rotate in a counter-clockwise direction about pin 58 and thereby carry its related brake shoe assembly 30 into engagement with tread surface 28 presented by adjacent wheel 26. It will be understood that although automatic slack adjuster 60 is operable to change the location of pin 58 in order to compensate for slack caused by wear of parts, for any given operation of the brake mechanism, the location of pin 52 is fixed relative to the frame so the pin 52 may properly be considered a fixed fulcrum for lever 48.

Thus, it will be seen that the invention provides a compact and efficient floating brake linkage arrangement utilizing a minimum of parts and requiring only a small amount of space so as to be particularly adaptable for use for the inboard type truck shown, because the entire brake mechanism can be detachably mounted on the outboard side of the frame side member 14 between the wheels.

I claim:

1. In a single shoe tread brake arrangement for a railway vehicle truck having a frame and a pair of supporting wheel and axle assemblies with wheels disposed outboardly of the frame, the combination of: friction means disposed inwardly adjacent the wheels of respective assemblies for engagement therewith; a pair of hanger links pivoted at their upper ends to the frame and pivoted at their lower ends to respective friction means; a pair of generally vertical brake levers pivoted intermediate their ends to respective friction means; a compression rod having its opposite ends pivoted to the lower ends of respective brake levers; a slack adjuster pivoted to the frame and pivotally connected to the upper end of one of the brake levers; and a power cylinder having a housing pivotally connected to the upper end of the other brake lever and having a relatively movable piston rod pivoted to the frame.

2. In a single shoe tread brake arrangement for a railway vehicle truck having a frame and a pair of supporting wheel and axle assemblies with wheels disposed outboardly of the frame, the combination of: friction means disposed inwardly adjacent the wheels of respective assemblies for engagement therewith; a pair of generally vertical brake levers pivoted intermediate their ends to respective friction means; a compression rod having its opposite ends pivoted to the lower ends of respective brake levers; a slack adjuster pivoted to the frame and pivotally connected to the upper end of one of the brake levers; and a power cylinder having a housing pivotally connected to the upper end of the other brake lever and having a relatively movable rod pivoted to the frame.

3. In a single shoe tread brake arrangement for a railway vehicle truck having a frame and a pair of supporting wheel and axle assemblies with wheels disposed outboardly of the frame, the combination of: friction means disposed inwardly adjacent the wheels of respective assemblies for engagement therewith; a pair of brake levers pivoted to respective friction means; a rod having its opposite ends pivoted to the respective brake levers; a slack adjuster pivoted to the frame and pivotally conneectd to one of the brake levers; and a power cylinder having a housing pivotally connected to the other brake lever and having a relatively movable rod pivoted to the frame.

4. In a tread brake arrangement for a railway vehicle truck having a frame and a pair of supporting wheel and axle assemblies, the combination of: friction means disposed for engagement with respective assemblies; a pair of vertical brake levers pivotally connected intermediate their ends to respective friction means; a compression rod pivotally connected adjacent opposite ends to the lower ends of respective brake levers; a slack adjuster pivoted to the frame and pivotally connected to the upper end of one of the brake levers; and a power device having one portion pivotally connected to the upper end of the other brake lever and having another relatively movable portion pivotally connected to the frame.

5. In a tread brake arrangement for a railway vehicle truck having a frame and a pair of supporting wheel and axle assemblies, the combination of: friction means disposed for engagement with respective assemblies; a power cylinder having a pair of relatively movable parts one of which is pivoted to the frame; a slack adjuster pivoted to the frame; a pair of generally vertical brake levers pivoted intermediate their ends to respective friction means, one of said brake levers being fulcrumed at its upper end to the slack adjuster, the other of said brake levers being fulcrumed at its upper end to the other of said power cylinder parts; and a rod interconnecting said levers.

6. In a brake arrangement for a railway vehicle truck having a frame and a pair of supporting wheel and axle assemblies, the combination of: friction means disposed for engagement with respective assemblies; a pair of brake levers pivotally connected to respective friction means; a rod pivoted adjacent opposite ends to respective brake levers and constituting the sole member interconnecting the brake members; a slack adjuster device having one portion pivotally connected to the frame and having another portion pivotally connected to the upper end of one of said levers; and a power cylinder having a pair of relatively movable parts pivotally connected to the frame and to the other of said brake levers, respectively.

7. In a brake arrangement for a railway vehicle truck having a frame and a pair of supporting wheel and axle assemblies, the combination of: friction means disposed for engagement with respective assemblies; a pair of generally vertical brake levers pivotally connected intermediate their ends to respective friction means; a rod pivoted adjacent opposite ends to the lower ends of respective brake levers and constituting the sole member interconnecting the brake members; means pivotally supporting the upper end of one of said levers; and a power cylinder having a pair of relatively movable parts pivotally connected to the frame and to the upper end of the other of said brake levers, respectively.

8. In a brake arrangement for a railway vehicle having a frame and a supporting wheel and axle assembly, the combination of: a unified assembly including bracket means mounted on the frame adjacent the wheel of said assembly and supporting the members hereinafter stated, friction means disposed for engagement with said assembly; a brake lever pivotally connected to said friction means; means pivotally mounting said lever; and a power cylinder member having a cylinder element and a relatively movable rod element, one of said elements being pivotally connected directly to the brake lever and the other of said elements being pivotally connected directly to the bracket means.

9. In a single shoe tread brake arrangement for a railway vehicle truck having a frame and a pair of supporting wheel and axle assemblies with wheels dosposed outboardly of the frame, the combination of: a unified assembly including a pair of brackets mounted on the frame between wheels of respective assembles and supporting the members hereinafter stated, friction means disposed inwardly adjacent the wheels of respective assemblies for engagement therewith; a pair of brake levers pivoted to respective friction means; a rod having its opposite ends pivoted to the respective brake levers; a slack adjuster pivoted to one of the brackets and pivotally connected to one of the brake levers; and a power cylinder having a housing pivotally connected to the other brake lever and having a relatively movable rod pivoted to the other bracket.

References Cited in the file of this patent

UNITED STATES PATENTS

| | | |
|---|---|---|
| 134,178 | Westinghouse | Dec. 24, 1872 |
| 643,011 | Shaw | Feb. 6, 1900 |
| 876,456 | Hines | Jan. 14, 1908 |
| 1,736,046 | Madden | Nov. 19, 1929 |
| 2,177,961 | Farmer | Oct. 31, 1939 |
| 2,927,662 | Polanin | Mar. 8, 1960 |